United States Patent [19]

Stephenson

[11] Patent Number: 5,101,860
[45] Date of Patent: Apr. 7, 1992

[54] FLUID CONTROLLER AND IMPROVED CHECK VALVE ARRANGEMENT THEREFOR

[75] Inventor: Dwight B. Stephenson, Savage, Minn.

[73] Assignee: Eaton Corporation, Cleveland, Ohio

[21] Appl. No.: 767,725

[22] Filed: Sep. 30, 1991

[51] Int. Cl.$^5$ .............................................. F15B 13/04
[52] U.S. Cl. ............................... 137/625.24; 60/384; 91/436; 91/467
[58] Field of Search .................... 60/384; 91/436, 467; 137/625.24

[56] References Cited

U.S. PATENT DOCUMENTS

| | | |
|---|---|---|
| Re. 25,126 | 2/1962 | Charlson . |
| 3,443,586 | 5/1969 | Christensen . |
| 4,159,723 | 7/1979 | Baatrup et al. . |
| 4,311,171 | 1/1982 | Roberts . |
| 4,362,479 | 12/1982 | Pahl . |

*Primary Examiner*—Gerald A. Michalsky
*Attorney, Agent, or Firm*—L. J. Kasper

[57] ABSTRACT

A fluid controller (15) is disclosed of the type including a primary, spool valve (41) and a rotatable follow-up valve member (43). The controller includes a housing (23) defining an inlet port (31), a return port (33), and control fluid ports (35 and 37). The return port is in communication with an interior chamber (33c) disposed within the spool valve (41). The controller is of the type including a fluid meter (21) through which the fluid flows as part of the main fluid path, imparting the follow-up movement to the follow-up valve member (43). Anti-cavitation check valves (95L, 95R) are disposed in the spool valve, and permit direct communication from the interior chamber of the spool into the main fluid path when the valving returns to neutral (FIGS. 3 and 5) after cavitation occurs. In addition, manual steering check valves (97L, 97R) are disposed in the spool valve, and are operable to communicate fluid from the interior chamber to the inlet side of the fluid meter when the valving is at maximum displacement, in a manual steering operation (FIGS. 4 and 6).

11 Claims, 5 Drawing Sheets

FLUID CONTROLLER AND IMPROVED CHECK VALVE ARRANGEMENT THEREFOR

BACKGROUND OF THE DISCLOSURE

The present invention relates to fluid controllers of the type used to control the flow of fluid from a source of pressurized fluid to a fluid pressure operated device, and particularly, to such controllers which are used to control the flow of pressurized fluid to a vehicle steering cylinder.

A typical fluid controller of the type to which the present invention relates includes a housing, which defines various fluid ports, and further includes valving operable in response to an input, such as the rotation of the vehicle steering wheel. This typical controller also includes an arrangement, such as a fluid meter, for imparting follow-up movement to the valving in response to the flow of fluid through the fluid meter. The flow of fluid through the controller valving, the fluid meter, and to the steering cylinder, is generally proportional to the rate of rotation of the steering wheel.

Fluid controllers of this general type receive pressurized fluid at the inlet port, control the flow of pressurized fluid through a main variable flow control orifice, then to the fluid meter, and from the fluid meter pressurized fluid flows through another variable orifice, and then to the expanding chamber of the steering cylinder. Fluid being expelled from the contracting chamber of the steering cylinder flows through the controller valving and then to the system reservoir.

The flow path described above is typically referred to as the "main fluid path", and in theory, all parts of this flow path, upstream of the steering cylinder, contain pressurized fluid during any particular operation of the fluid controller. However, there are various operating conditions which occur periodically, wherein not all parts of the main fluid path contain pressurized fluid, as is normally desired.

Occasionally, the steering cylinder is subjected to an "overrunning" load, wherein an external force is applied to the cylinder, tending to bias it in the same direction as it is being displaced by the pressurized fluid in the main fluid path. When the steering cylinder is subjected to an overrunning load, it is common for cavitation to occur, wherein a void or "bubble" occurs in the main fluid path, upstream of the steering cylinder. Such a cavitation void may not result in an immediate problem, but typically, such a void migrates into the fluid meter, and at the time of the next steering operation, the presence of the void in the fluid meter can, in an extreme condition, result in loss of steering control. It is important to note that, between the time that the cavitation void occurs, and the time of the next steering operation, the controller valving has typically returned to the neutral position.

Another operating condition which occurs periodically is operation in the manual steering mode. This typically occurs when there is an engine or pump failure, such that there is no pressurized fluid available at the inlet port of the fluid controller. In that case, the vehicle operator rotates the steering wheel with sufficient manual input force to cause the fluid meter to operate as a hand pump, pumping fluid through the remainder of the main fluid path to the steering cylinder.

In either of the operating conditions described above, it is necessary to supply fluid to the main fluid path, and this has typically been done by means of anti-cavitation and manual steering check valves disposed in the housing of the fluid controller. Typically, these check valves are disposed to permit fluid to flow from the return port of the controller into the inlet port, (manual steering checks) or into the work port (anti-cavitation checks), whenever the fluid pressure at the inlet port, or the work port, is below that of the return port. The performance of the prior art arrangement described above has been generally satisfactory, although the machining of the necessary bores and passages to provide for the manual steering check valves represents a substantial increase in the complexity and expense of the controller housing. In the case of the anti-cavitation check valves, these have typically been housed in a port block valve (bolted to the port face of the controller, which also represents a substantial increase in the expense and overall size of the controller.

One functional disadvantage of the typical prior art arrangement of the manual steering check valves being in the controller housing is that the fluid flowing past the check valve has typically had to flow through the series arrangement of variable flow control orifices in the main fluid path. These orifices are fully open during a normal steering operation and are closed when the valve is in neutral. If a bubble is trapped in the fluid meter, when the fluid controller returns to neutral, steering may be lost upon steering wheel input.

SUMMARY OF THE INVENTION

Accordingly, it is an object of the present invention to provide an improved fluid controller having check valve capability, without the need for additional and expensive machining of the controller housing, or the need for an additional valve.

It is another object of the present invention to provide an improved manual steering check valve arrangement for a fluid controller which provides a flow path to the fluid meter when the fluid controller is in the neutral position.

The above and other objects of the invention are accomplished by the provision on an improved controller operable to control the flow of fluid from a source of pressurized fluid to a fluid pressure actuating device, the controller being of the type including housing means defining an inlet port for connection to the source, a return port for connection to the system reservoir, and first and second control fluid ports for connection to the fluid pressure operated device. A valve means is disposed in the housing means and comprises a primary, rotatable valve member and a cooperating, relatively rotatable follow-up valve member. The primary and follow-up valve members define a neutral position, and a first operating position in which the primary valve member is rotatably displaced from the neutral position, relative to the follow-up valve member. The housing means and the valve means cooperate to define a main fluid path communicating between the inlet port and the first control fluid port, and between the second control fluid port and the return port when the valve means is in the first operating position. The controller includes fluid actuated means for imparting follow-up movement to the valve means proportional to the volume of fluid flow through the fluid actuated means, the fluid actuated means being disposed in series flow relationship in the main fluid path between the inlet port and the first control fluid port. The primary valve member comprises a hollow, generally cylindrical spool member defining an interior chamber in fluid communication with the return port.

The improved controller is characterized by check valve means disposed in one of the primary and follow-up valve members, and being operable to communicate fluid from the interior chamber defined by said primary valve member, into the main fluid path at a predetermined location, whenever the fluid pressure in the interior chamber is greater than the fluid pressure in the main fluid path, at the predetermined location.

In accordance with a further aspect of the present invention, the predetermined location is disposed between the inlet port and the fluid actuated means.

In accordance with a still further aspect of the present invention, the predetermined location is disposed between the fluid actuated means and the first control fluid port.

DESCRIPTION OF THE PREFERRED EMBODIMENT

Figure 1:
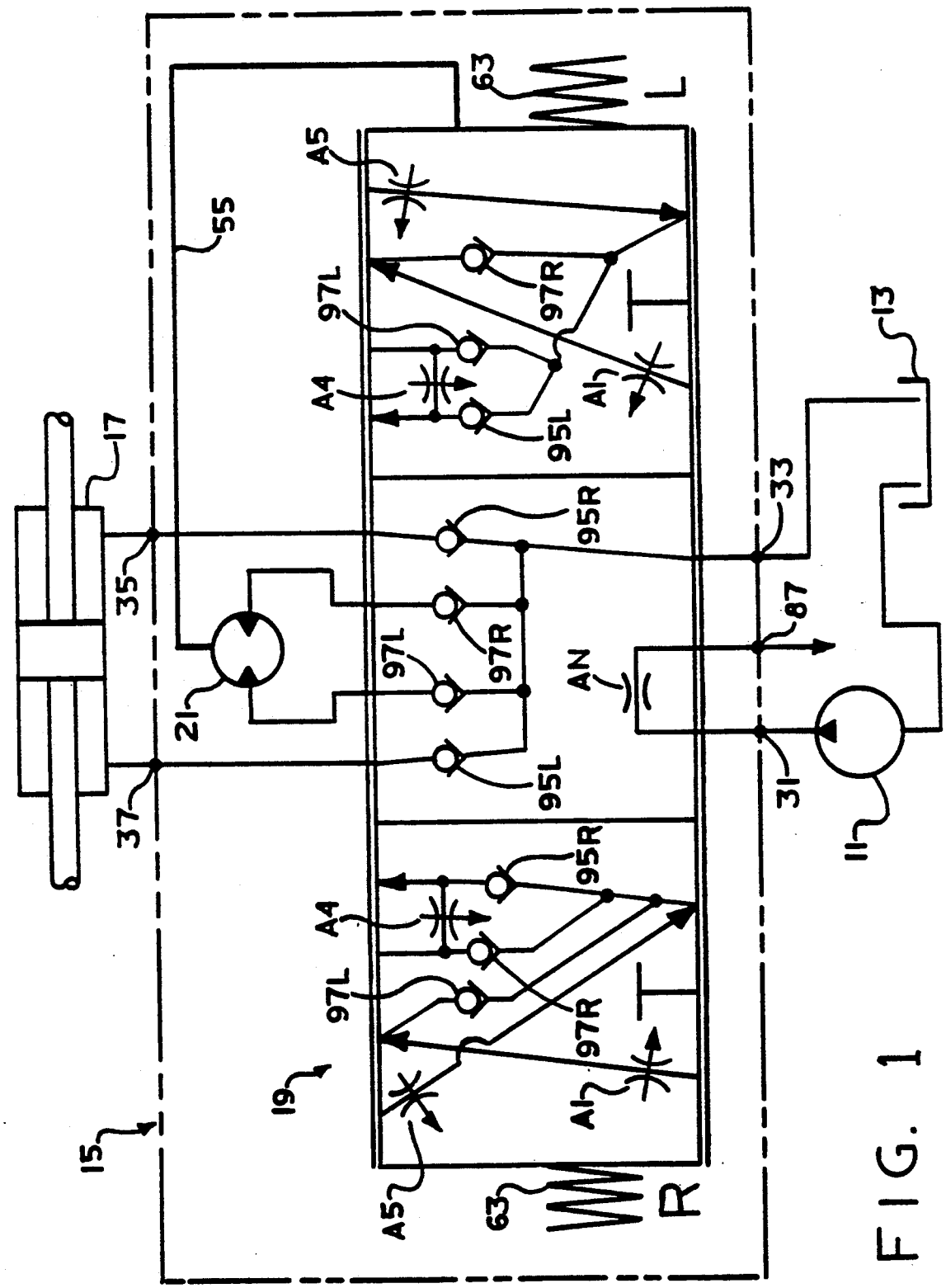
FIG. 1 is a hydraulic schematic of a fluid controller made in accordance with the present invention.

Referring now to the drawings, which are not intended to limit the invention, FIG. 1 is a hydraulic schematic of a fluid controller of the type which is typically used in a vehicle hydrostatic power steering system, also referred to as a full fluid-linked power steering system. The system includes a source of pressurized fluid, shown in FIG. 1 merely as a fluid pump 11, having its inlet connected to a system reservoir 13 in a manner well-known to those skilled in the art.

Referring still to FIG. 1, the steering system includes a fluid controller, generally designated 15, which controls the flow of fluid to a steering cylinder 17. The fluid controller 15, which will be described in greater detail in connection with FIG. 2, may be of the general type illustrated and described in U.S. Pat. No. Re. 25,126, and in the subject embodiment, is more specifically of the type illustrated and described in U.S. Pat. No. 4,109,679, both of which are assigned to the assignee of the present invention and incorporated herein by reference. Disposed within the fluid controller 15 is a valving arrangement, generally designated 19, which is movable from its neutral position shown in FIG. 1, to either a right turn position R, or a left turn position L. In the subject embodiment, each of the right turn position R and the left turn position L of the valving 19 is illustrated as comprising a single valving position although, as is known to those skilled in the art, the graphic representation of the valving 19 indicates that there is "infinite" variability between the neutral (centered) position and the two maximum displacement positions of the valving 19.

When the valving arrangement 19 is in either the right turn position R or the left turn position L, (in the normal operating position), the pressurized fluid from the pump 11 flows through the valving 19, then flows through a fluid meter 21, one function of which is to measure (meter) the proper amount of fluid to be communicated to the steering cylinder 17. As is well-known to those skilled in the art, the other function of the fluid meter 21 is to provide follow-up movement to the valving 19, such that the valving 19 is returned to its neutral position (as in FIG. 1) after the desired amount of fluid has been communicated to the steering cylinder 17. This follow-up movement is achieved by a means which will be described in connection with the detailed description of FIGS. 3 through 6.

As may best be seen schematically in FIG. 1, the valving arrangement 19 defines a plurality of variable control orifices, whenever the valving 19 is moved from its neutral position to one of its operating positions. These variable orifices will be described in greater detail subsequently, in conjunction with the description of FIGS. 3 through 5.

Fluid Controller 15

Figure 2:
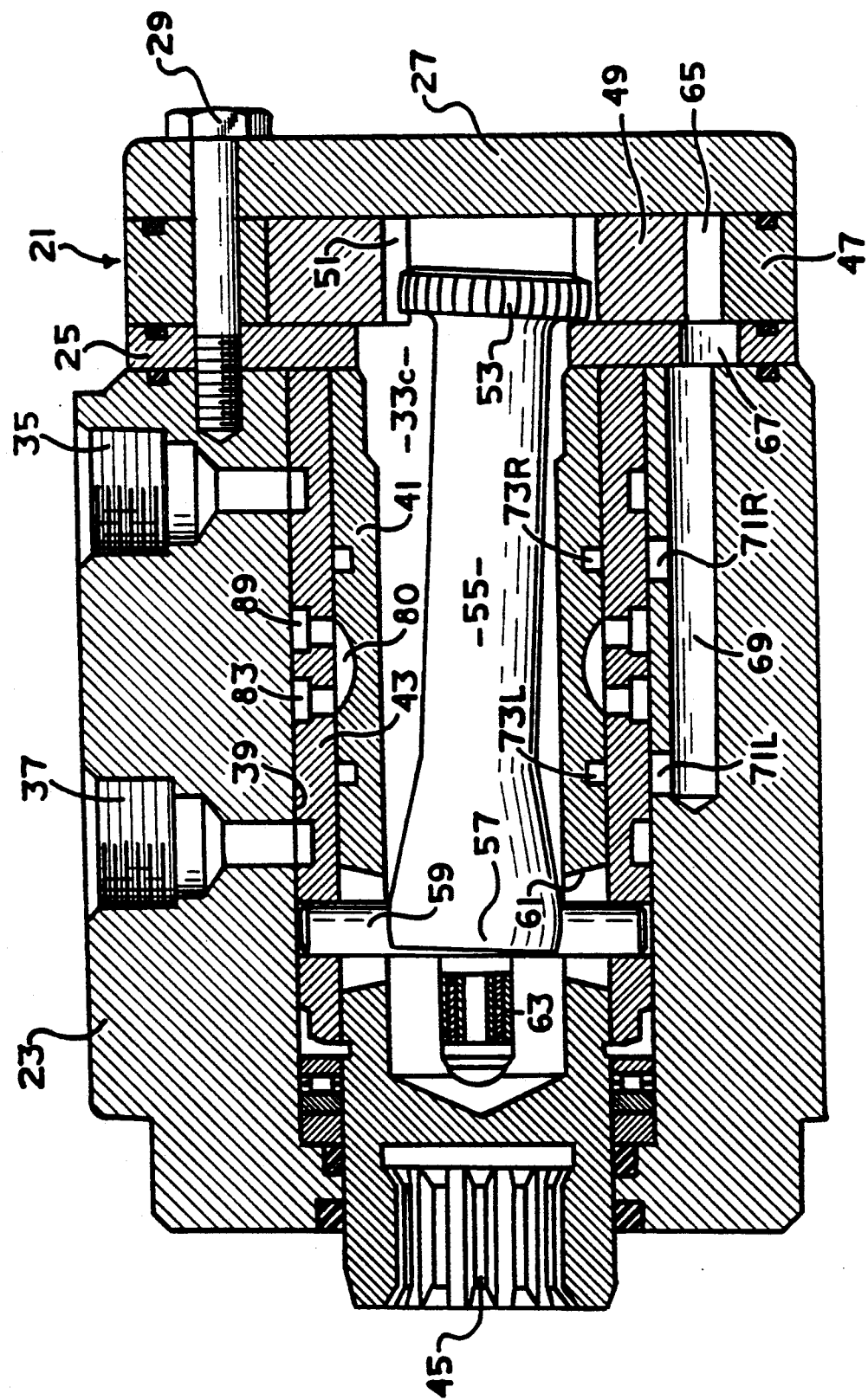
FIG. 2 is an axial cross-section of a fluid controller of the type with which the present invention may be utilized.

Referring now to FIG. 2, the construction of the controller 15 will be described in some detail. The fluid controller 15 comprises several sections, including a housing section 23, a port plate 25, a section comprising the fluid meter 21, and an end plate 27. These sections are held together in tight sealing engagement by means of a plurality of bolts 29 which are in threaded engagement with the housing section 23. The housing section 23 defines an inlet port 31 and a return port 33 (both of which are shown only in FIG.1), and a pair of control fluid ports 35 and 37.

The housing section 23 further defines a valve bore 39, and disposed rotatably therein is the valving arrangement 19 shown schematically in FIG. 1. The valving 19 comprises a primary, rotatable valve member 41 ("spool"), and a cooperating, relatively rotatable follow-up valve member 43 ("sleeve"). As is well-known to those skilled in the art, the forward end (left end in FIG. 2) of the spool 41 includes a reduced diameter portion defining a set of internal splines 45 which provide for a direct mechanical connection between the spool 41 and a steering wheel (not shown). The spool 41 and sleeve 43 will be described in greater detail subsequently, in conjunction with FIGS. 3 through 6.

The fluid meter 21 may be of the type well-known in the art, and includes an internally-toothed stationary ring 47, and an externally-toothed moveable star 49. The star 49 defines a set of internal splines 51, and in splined engagement therewith is a set of external splines 53 formed at the rearward end of a drive shaft 55. The drive shaft 55 has a bifurcated forward end 57 permitting driving connection between the shaft 55 and the sleeve 43, by means of a pin 59 passing through a pair of pin openings 61 (see also FIG. 3) in the spool 41. Thus, pressurized fluid flowing through the valving 19 in response to rotation of the spool 41 flows through the fluid meter 21, causing orbital and rotational movement of the star 49 within the ring 47. Such movement of the star 49 causes follow-up movement of the sleeve 43 by means of the drive shaft 55 and pin 59, to maintain a particular relative displacement between the spool 41 and sleeve 43, proportional to the rate of rotation of the steering wheel. A plurality of leaf springs 63 extend through openings in the spool 41, biasing the sleeve 43 toward the neutral position, relative to the spool.

The toothed interaction of the star 49, orbiting and rotating within the ring 47, defines a plurality of expanding and contracting fluid volume chambers 65, and adjacent each chamber 65, the port plate 25 defines a fluid port 67. The housing section 23 defines a plurality of axial bores 69 (only one of which is shown in FIG. 2), each of which is in open communication with one of the fluid ports 67. The housing section 23 further defines a pair of radial bores 71L and 71R, providing communication between each of the axial bores 69 and the valve bore 39, for reasons to be described subsequently.

Valving Arrangement 19

Figure 3:
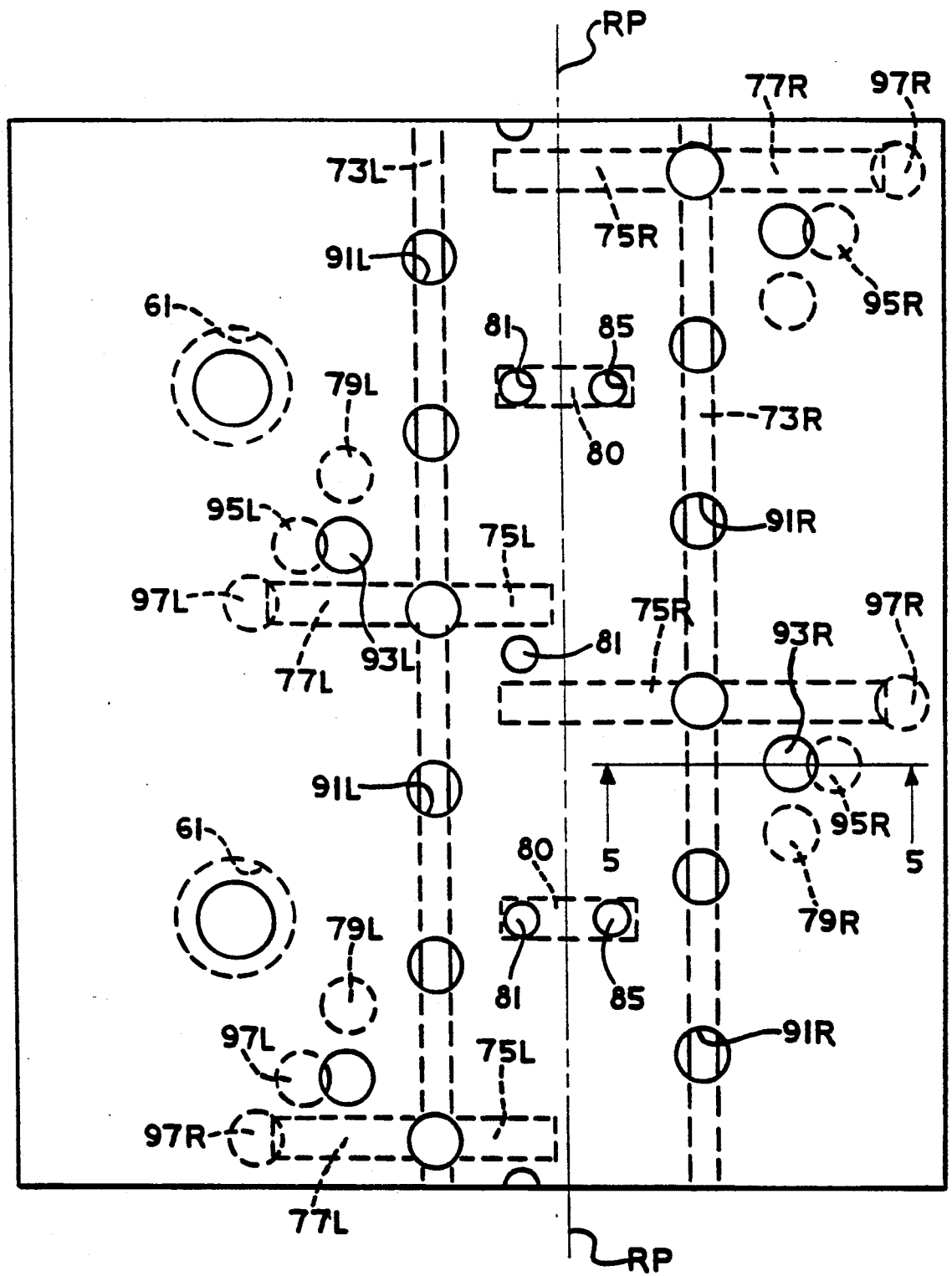
FIG. 3 is an overlay view of the valving of the fluid controller shown in FIGS. 1 and 2, but on a larger scale than in FIG. 2, and with the valving in its neutral position.
Figure 4:
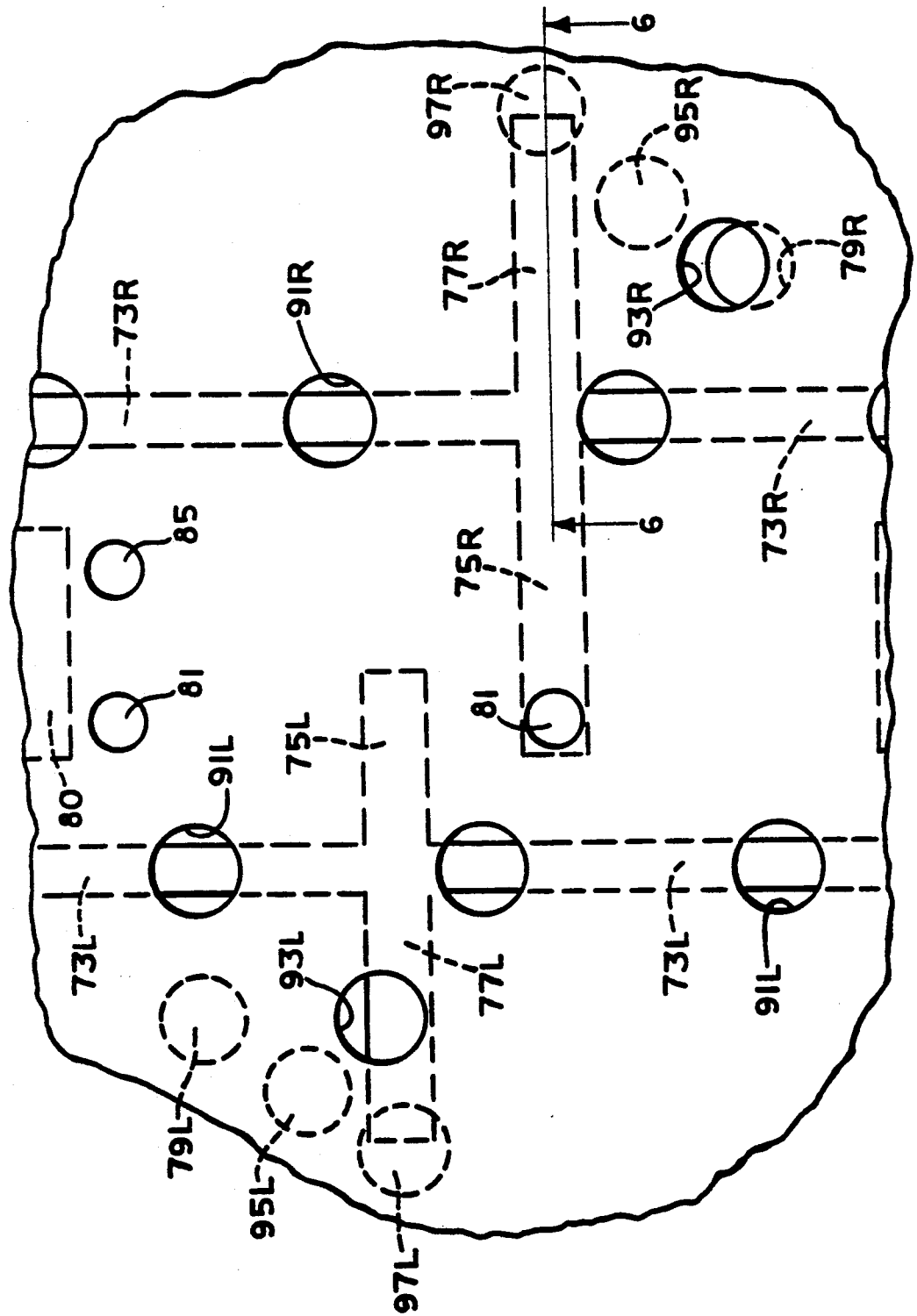
FIG. 4 is a further enlarged, fragmentary, overlay view, similar to FIG. 3, with the valving in its operating position.

Referring now primarily to FIG. 3, the spool 41 and sleeve 43 will be described in detail. In connection with the subsequent description, it should be noted that many of the ports and passages are arranged symmetrically with respect to a central reference plane RP, and such elements will be described by a reference numeral followed by either an L or an R to indicate that the element is located on either the left side or the right side respectively, of the reference plane RP. On the other hand, certain of the elements do not have a corresponding element oppositely disposed about the reference plane RP, and will be referred to by use of a reference numeral alone. It should be understood that the overlay views of FIGS. 3 and 4 are intended to illustrate primarily the interface between the spool 41 and sleeve 43, and as a result, do not show all of the various features defined on the outer surface of the sleeve 43.

The spool 41 defines a pair of circumferential meter grooves 73L and 73R, which are approximately equally and oppositely disposed about the reference plan RP. In fluid communication with the meter groove 73L is a pair of pressure passages 75L, and in fluid communication with the meter groove 73R is a pair of pressure passages 75R. Also in fluid communication with the meter groove 73L is a pair of operating passages 77L, and in fluid communication with the meter groove 73R is a pair of operating passages 77R. In addition to the above-described grooves and passages which are formed on the outer surface of the spool 41, the spool defines a plurality of tank ports 79L and a pair of tank ports 79R. The tank ports 79L and 79R are in fluid communication with an interior chamber 33c of the spool 41, so that low pressure, return fluid passes through the interior of the spool 41 and radially outward through the spring openings 61 which are in communication with the return port 33. Finally, the spool 41 defines a pair of axial slots 80, the function of which will be described subsequently.

The sleeve 43 defines a plurality of pressure ports 81, which are disposed to be in continuous fluid communication with the inlet port 31 by means of an annular groove 83 (shown only in FIG. 2) defined on the exterior cylindrical surface of the sleeve 43. Disposed to the right of the pressure ports 81 is a pair of neutral ports 85, which are disposed to be in continuous fluid communication with a high pressure carryover port 87 (see FIG. 1), by means of an annular groove 89 (also shown only in FIG. 2) and defined on the exterior surface of the sleeve. Although the subject embodiment of the present invention includes closed-center valving, with high-pressure-carryover (power-beyond) capability, it will become apparent to those skilled in the art that the invention would be equally applicable to controllers having open-center or load sensing valving. Also, although the invention is illustrated and described in connection with one particular type of valving architecture, it is believed to be adaptable to most types of architecture.

Equally and oppositely disposed about the reference plane RP is a plurality of meter ports 91L, and a plurality of meter ports 91R, the meter ports 91L being in continuous fluid communication with the meter groove 73L, and the meter ports 91R being in continuous fluid communication with the meter groove 73R. At the same time, the meter ports 91L are disposed for commutating fluid communication with the radial bores 71L, while the meter ports 91R are disposed for commutating fluid communication with the radial bores 71R, in a manner well-known to those skilled in the art. Equally and oppositely disposed about the reference plane RP, is a pair of operating ports 93L, and a pair of operating ports 93R. With the valving arrangement 19 in the neutral position shown in FIGS. 1 and 3, each operating port 93L is approximately evenly disposed between an operating passage 77L and a tank port 79L. Similarly, each operating port 93R is approximately evenly spaced between an operating passage 77R and a tank port 79R.

Operation of Valving

It is believed that the basic operation of the fluid controller 15 and valving arrangement 19 described thus far should be readily apparent in view of the teachings of the above-incorporated patents. However, the operation of the controller and valving will be described briefly, partly to relate the structure illustrated in FIGS. 2 through 6 to the schematic of FIG. 1.

Referring still primarily to FIG. 3, when the valving 19 is in the neutral position (no rotation of the steering wheel), pressurized fluid is communicated from the inlet port 31 into the annular groove 83, and then through the two pressure ports 81 which are in open communication with the axial slots 80. Pressurized fluid flows through the slots 80, then through the neutral ports 85, into the annular groove 89, and from there to the high-pressure-carryover port 87. The cumulative overlap of the pressure ports 81, the neutral ports 85, and the axial slots 80 comprises a variable neutral orifice AN (see FIG. 1). With the valving 19 in the neutral position of FIG. 3, flow through the other pressure ports 81 is blocked by the outer surface of the spool 41, and there is no fluid flow through the rest of the valving 19 or the fluid meter 21.

When the steering wheel is rotated at a particular speed of rotation, the spool 41 is displaced, relative to the sleeve 43, by a particular rotational displacement. Thereafter, with continued rotation of the wheel, the fluid flowing through the fluid meter 21 results in follow-up movement of the sleeve 43, to maintain the particular rotational displacement.

Referring now to FIG. 4, in conjunction with FIG. 3, the spool 41 is displaced, relative to the sleeve 43 to select a left turn position L. With the spool 41 displaced as shown in FIG. 4, corresponding to the normal operating position illustrated schematically in FIG. 1, pressurized fluid is able to flow from two of the pressure ports 81 into the respective pressure passages 75R, the area of overlap therebetween cumulatively comprising a main variable flow control orifice A1 (see FIG. 1). Pressurized fluid flows from each pressure passage 75R into the meter groove 73R, then radially outward through the meter ports 91R. This pressurized, unmetered fluid is then communicated to the fluid meter 21 through certain of the axial bores 69, then returns from the fluid meter 21 through the other of the axial bores 69 as pressurized, metered fluid. The metered fluid then flows through the meter ports 91L (see FIG. 3), into the meter groove 73L, and from there the metered fluid flows into the operating passages 77L, then flows through the respective operating ports 93L. The overlap between the passages 77L and the ports 93L cumulatively comprises a variable flow control orifice A4 (see FIG. 1).

Fluid flowing through the operating ports 93L then flows to the control fluid port 37, then to the steering cylinder 17. Fluid which is exhausted from the cylinder 17 is communicated through the control fluid port 35 to the operating ports 93R, and then through the tank ports 79R, the area of overlap therebetween cumulatively comprising a variable flow control orifice A5 (see FIG. 1). Return fluid flowing through the A5 orifice then flows to the return port 33 as was described previously. The flow path described above will be referred to hereinafter as the "main fluid path", and it should be noted by reference to FIGS. 1 and 3 that, if the spool is displaced, relative to the sleeve, in the opposite direction, so that the valving 19 is in the right turn position R, the flow through the valving will be in the "opposite" direction, and will flow to the control fluid port 35, then to the steering cylinder 17, returning to the control fluid port 37.

Check Valve Arrangement

Referring again, initially, to FIG. 3, the check valve arrangement of the present invention will now be described. With the spool 41 and the sleeve 43 in the neutral position shown in FIG. 3, there are a pair of anti-cavitation check valves, generally designated 95L, disposed, in the spool 41, adjacent the operating ports 93L. Similarly, there are a pair of anti-cavitation check valves 95R disposed, in the spool 41, adjacent the operating ports 93R.

Referring still to FIG. 3, at the end of each of the operating passages 77L is a manual steering check valve, generally designated 97L, and similarly, at the end of each of the operating passages 77R is a manual steering check valve, generally designated 97R.

Figure 5:
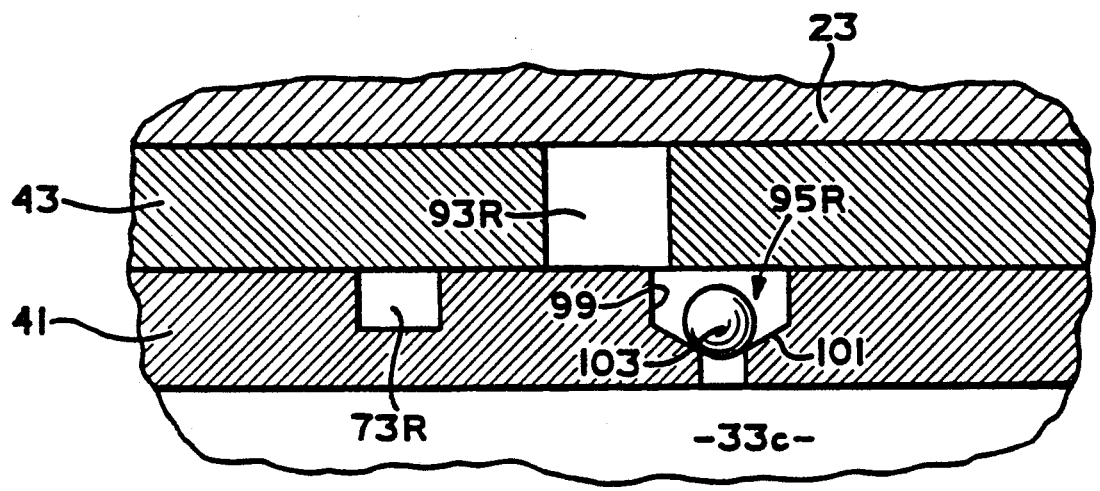
FIG. 5 is an enlarged, fragmentary, axial cross-section taken on line 5—5 of FIG. 3.

Referring now primarily to FIGS. 1, 3, and 5, the operation of the anti-cavitation check valves 95R will be described, it being understood that the operation of the check valves 95L would be substantially identical, but for the opposite direction of steering. As was described in the Background of the Disclosure, the occurrence of an overrunning load on the steering cylinder 17 can result in a void in the main fluid path which can result in a loss of steering control during the next steering operation. In the meantime, however, the spool 41 and sleeve 43 first return to the neutral position shown in FIG. 3. For purposes of further explanation, it will be assumed that the cavitation void occurred while the controller 15 was executing a right turn (the spool 41 displaced "downward" relative to the sleeve 43 in FIG. 3). Therefore, the void would typically be between the outlet side of the fluid meter 21 and the control fluid port 35. In that case, the main fluid path included the operating ports 93R, and after the spool and sleeve returned to the neutral position of FIG. 3, each of the anti-cavitation check valves 95R permits communication of fluid from the slightly pressurized interior chamber 33c through the check valve 95R into the operating port 93R, and from there, into the chamber of the steering cylinder 17 in communication with control fluid port 35. The communication of fluid as described above is typically sufficient to eliminate the cavitation void or bubble in that part of the main fluid path.

Figure 6:
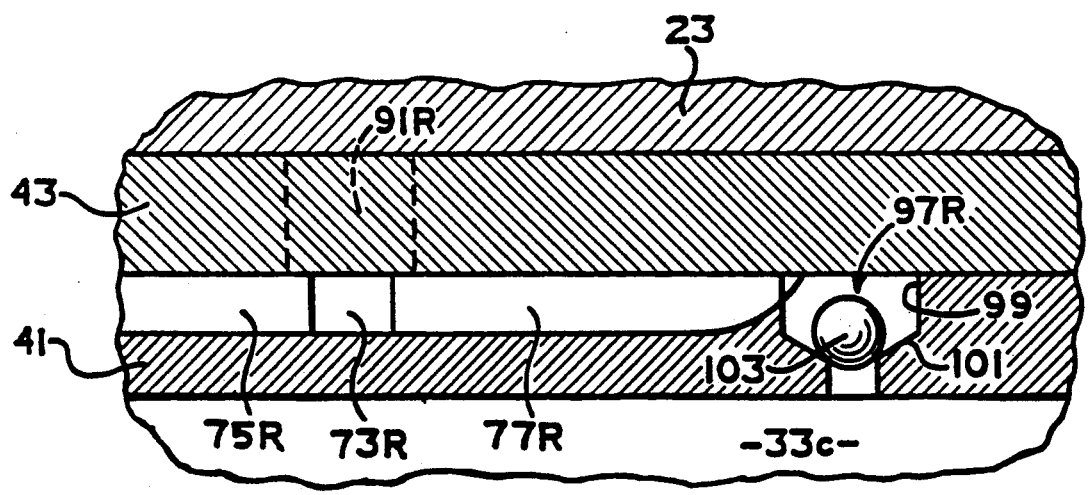
FIG. 6 is an enlarged, fragmentary, axial cross-section, on the same scale as FIG. 5, taken on line 6—6 of FIG. 4.

As may best be seen in FIG. 5, each of the anti-cavitation check valves includes a multi-step bore 99 which defines a valve seat 101. Disposed within the bore 99, and normally in engagement with the seat 101 is a check ball 103. The specific structure of check valve illustrated in FIGS. 5 and 6 is, by way of example only, the specific construction of the check valves not being an essential part of the present invention. It should be understood that the important aspect of the present invention is the location of the check valves within the controller valving, and in the subject embodiment, in the spool 41. This location of the check valves minimizes the amount of machining required to provide for the check valves, and the machining which must be done can be done at the same time as the other machining being performed on the spool 41. Referring now primarily to FIGS. 1, 4, and 6, the operation of the manual steering check valves 97R will now be described, and it may be noted in FIG. 6 that the specific construction of the manual steering check valve 97R is the same as that of the anti-cavitation check valve 95R, and only the location differs.

As is well known to those skilled in the art, in order to achieve manual steering of a fluid controller of this type, the spool 41 is necessarily at its maximum displacement relative to the sleeve 43. That is because the vehicle operator is rotating the spool 41 by means of the steering wheel, and the pin opening 61 defined by the spool 41 is driving the pin 59, which, in turn, drives the drive shaft 55 and the gerotor star 49, causing the fluid meter 21 to operate as a hand pump.

With the spool 41 at its maximum displacement in a left turn condition, as is illustrated in FIGS. 4 and 6, the normal path of fluid communication would be from the pressure port 81 into the pressure passage 75R, and from there through the meter ports 91R to the fluid meter 21. However, the manual steering condition occurs, by definition, because there is an absence of pressurized fluid at the inlet port 31. Therefore, the manual rotation of the fluid meter 21 is an attempt to build pressurized fluid downstream of the meter 21, pumping it through the meter ports 91L into the meter groove 73L, and from there through the operating passages 77L, and through the operating ports 93L to the control fluid port 37. However, in order to perform such a manual steering operation, in which the fluid meter 21 operates as a pump, there must be a "source" of fluid available at the inlet side of the fluid meter 21, and if there is insufficient fluid, cavitation will occur in the fluid meter, and it will not be possible to build sufficient pressure to accomplish even a manual steering operation. Therefore, the manual steering check valve 97R permits communication of fluid from the interior chamber 33c into the operating passage 77R, and into the meter groove 73R, from where it can fill each of the meter ports 91R, providing sufficient inlet fluid to the fluid meter 21 to permit it to operate as a pump.

The present invention has been described in connection with an embodiment which includes both anti-cavitation check valves and manual steering check valves, and wherein each of those check valve functions has been described as being accomplished by a separate set of check valves. For example, the anti-cavitation check valve function was described as being accomplished solely by the anti-cavitation check valves 95R (or 95L). However, it should be understood by those skilled in the art that in the potential cavitation situation described herein, the manual steering check valves 97R (or 97L) would also be effective in communicating fluid from the interior chamber 33c into the fluid meter 21, through the passages 77R and the meter ports 91R. It is one important aspect of the present invention that there are, in the subject embodiment shown in FIG. 3, a total of eight check valves, and in the situation just described, four of those check valves would be involved in eliminating the cavitation condition. Therefore, the present invention can easily and inexpensively increase the total effective check valve capability of the fluid controller.

Another important aspect of the present invention is the relatively direct communication of fluid from the interior chamber 33c past the manual steering check valves 97L (or 97R), into the main fluid path, at a location between the main variable flow control orifice A1 and the fluid meter 21. Therefore, there is relatively little restriction to the flow of fluid past the manual steering check valves. This arrangement in the present invention is in contrast to the prior art manual steering check valve arrangement described previously, wherein the check valve is disposed to permit the flow of fluid from the return port into the inlet port, from where it was required to flow through the various control orifices in the main fluid path, upstream of the fluid meter, typically undergoing a substantial pressure drop across those control orifices.

As was described previously, the check valves of the present invention are versatile. As a further example of this, during the left turn condition illustrated in FIG. 4, while the manual steering check valve 97R would facilitate manual steering, the manual steering check valve 97L would be available immediately to help overcome the effects of an overrunning load, if one were to occur suddenly, and prevent cavitation. It may also be seen in FIG. 4 that if the spool and sleeve were only partially displaced, the anti-cavitation check valve 95L would still be in communication with the operating port 93L, as further protection against cavitation. Of course, the configuration of the passages housing the anti-cavitation check valves could be modified to extend the range of communication of those check valves with their associated operating ports, so that they are effective to feed fluid into the main fluid path at any spool-sleeve displacement, rather than primarily at, or near, neutral.

Although the invention has been described with reference to an embodiment in which the check valves are disposed in the spool valve, it should be understood that the invention is not so limited. The check valves could also be disposed in the sleeve 43; however, that would result in a more complicated arrangement in order to have return fluid available at the upstream end of the check valves.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A controller operable to control the flow of fluid from a source of pressurized fluid to a fluid pressure actuated device; said controller being of the type including housing means defining an inlet port for connection to the source of pressurized fluid, a return port for connection to a system reservoir, and first and second control fluid ports for connection to the fluid pressure operated device; valve means disposed in said housing means, and comprising a primary, rotatable valve member and a cooperating, relatively rotatable follow-up valve member, said primary and follow-up valve member defining a neutral position (FIG. 3), and a first operating position (FIG. 4) in which said primary valve member is rotatably displaced from said neutral position, relative to said follow-up valve member; said housing means and said valve means cooperating to define a main fluid path communicating between said inlet port and said first control fluid port, and between said second control fluid port and said return port when said valve means is in said first operating position; fluid actuated means for imparting follow-up movement to said valve means proportional to the volume of fluid flow through said fluid actuated means, said fluid actuated means being disposed in series flow relationship in said main fluid path between said inlet port and said first control fluid port; said primary valve member comprising a hollow, generally cylindrical spool member defining an interior chamber, said interior chamber being in fluid communication with said return port; characterized by:

(a) check valve means disposed in one of said primary valve member and said follow-up valve member, and operable to communicate fluid from said interior chamber into said main fluid path at a predetermined location, whenever the fluid pressure in said interior chamber is greater than the fluid pressure in said main fluid path, at said predetermined location.

2. A controller as claimed in claim 1 characterized by said predetermined location being disposed between said inlet port and said fluid actuated means.

3. A controller as claimed in claim 2, characterized by said primary valve member defining a first fluid passage, and said follow-up valve member defining a first fluid port in continuous fluid communication with said inlet port, said first fluid port being blocked from fluid communication with said first fluid passage when said valve members are in said neutral position (FIG. 3), and said first fluid port being in fluid communication with said first fluid passage when said valve members are in said first operating position (FIG. 4), to define a first variable flow control orifice, disposed between said inlet port and said fluid actuated means, and comprising a part of said main fluid path.

4. A controller as claimed in claim 3, characterized by said predetermined location being disposed between said first variable flow control orifice and said fluid actuated means.

5. A controller as claimed in claim 4, characterized by said check valve means including a stepped bore including an upstream portion in fluid communication with said interior chamber, and a downstream portion in fluid communication with said first fluid passage defined by said primary valve member.

6. A controller as claimed in claim 5, characterized by said fluid actuated means including inlet commutating passage means in communication with said first fluid passage defined by said primary valve member.

7. A controller as claimed in claim 1, characterized by said predetermined location being disposed between said fluid actuated means and said first control fluid port.

8. A controller as claimed in claim 7, characterized by said primary valve member defining a second fluid passage, and said follow-up valve member defining a second fluid port in continuous fluid communication with said first control fluid port, said second fluid port being blocked from fluid communication with said second fluid passage when said valve members are in said neutral position (FIG. 3), and said second fluid port being in fluid communication with said second fluid passage when said valve members are in said first operating position (FIG. 4), to define a second variable flow control orifice, disposed between said fluid actuated means, and said first control fluid port, and comprising a part of said main fluid path.

9. A controller as claimed in claim 8, characterized by said predetermined location being disposed between said fluid actuated means and said second variable flow control orifice.

10. A controller as claimed in claim 9, characterized by said check valve means including a stepped bore including an upstream portion in fluid communication with said interior chamber, and a downstream portion in fluid communication with said second fluid passage defined by said primary valve member.

11. A controller operable to control the flow of fluid from a source of pressurized fluid to a fluid pressure actuated device; said controller being of the type including housing means defining an inlet port for connection to the source of pressurized fluid, a return port for connection to a system reservoir, and first and second control fluid ports for connection to the fluid pressure operated device; valve means disposed in said housing means, and comprising a primary, rotatable valve member and a cooperating, relatively rotatable follow-up valve member, said primary and follow-up valve member defining a neutral position (FIG. 3), and a first operating position (FIG. 4) in which said primary valve member is rotatably displaced from said neutral position, relative to said follow-up valve member; said housing means and said valve means cooperating to define a main fluid path communicating between said inlet port and said first control fluid Port, and between said second control fluid port and said return port when said valve means is in said first operating position; said primary and follow-up valve members cooperating to define first and second variable flow control orifices disposed in said main fluid path between said inlet port and said first control fluid port; said primary valve member comprising a hollow, generally cylindrical spool member defining an interior chamber, said interior chamber being {n fluid communication with said return port; characterized by:

(a) check valve means disposed in one of said primary valve member and said follow-up valve member, and operable to communicate fluid from said interior chamber into said main fluid path at a predetermined location, said predetermined location being disposed between said second variable flow control orifice and said first control fluid port, whenever the fluid pressure in said interior chamber is greater than the fluid pressure in said main fluid path, at said predetermined location.

* * * * *